(12) United States Patent
Wang et al.

(10) Patent No.: US 10,536,331 B2
(45) Date of Patent: Jan. 14, 2020

(54) METHOD AND APPARATUS FOR CONFIGURATION UPLINK AND DOWNLINK CARRIERS

(71) Applicant: Samsung Electronics Co., Ltd., Suwon-si, Gyeonggi-do (KR)

(72) Inventors: Yi Wang, Beijing (CN); Yingyang Li, Beijing (CN); Chengjun Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 108 days.

(21) Appl. No.: 15/539,899

(22) PCT Filed: Dec. 28, 2015

(86) PCT No.: PCT/KR2015/014345
§ 371 (c)(1),
(2) Date: Jun. 26, 2017

(87) PCT Pub. No.: WO2016/105175
PCT Pub. Date: Jun. 30, 2016

(65) Prior Publication Data
US 2017/0346685 A1    Nov. 30, 2017

(30) Foreign Application Priority Data

Dec. 26, 2014   (CN) .......................... 2014 1 0833839

(51) Int. Cl.
*H04L 12/24*   (2006.01)
*H04L 5/00*    (2006.01)
(Continued)

(52) U.S. Cl.
CPC .......... *H04L 41/0803* (2013.01); *H04L 5/001* (2013.01); *H04L 5/0091* (2013.01);
(Continued)

(58) Field of Classification Search
CPC ... H04L 41/0803; H04L 5/001; H04L 5/0091; H04L 5/14; H04L 5/1469; H04W 16/32;
(Continued)

(56) References Cited

U.S. PATENT DOCUMENTS

2010/0118720 A1*  5/2010  Gauvreau ........... H04W 72/048
                                                                370/252
2011/0096735 A1*  4/2011  Damnjanovic ....... H04L 1/1861
                                                                370/329
(Continued)

FOREIGN PATENT DOCUMENTS

EP        2770785 A1    8/2014

*Primary Examiner* — Robert J Lopata
(74) *Attorney, Agent, or Firm* — Jefferson IP Law, LLP

(57) ABSTRACT

Embodiments of the present disclosure provide a method and an apparatus for configuring uplink and downlink carriers. In the embodiments of the present disclosure, the UE determines according to received uplink and downlink carrier configuration signaling, the pairing between the uplink and downlink carriers, and/or a timing reference downlink carrier for the uplink, and/or a pathloss reference cell for the uplink. Thus, the uplink and downlink carriers may be configured more flexibly. Further, through the configuration of the reference downlink carrier for the uplink timing and the uplink power control, the carrier aggregation performance and that on the unlicensed band may be supported more effectively, so as to improve the performance of the LTE system.

17 Claims, 4 Drawing Sheets

(51) Int. Cl.
  *H04L 5/14* (2006.01)
  *H04W 16/32* (2009.01)
  *H04W 72/04* (2009.01)
  *H04W 56/00* (2009.01)
  *H04W 88/02* (2009.01)

(52) U.S. Cl.
  CPC ............... *H04L 5/14* (2013.01); *H04W 16/32* (2013.01); *H04W 56/0045* (2013.01); *H04W 72/0446* (2013.01); *H04W 72/0453* (2013.01); *H04L 5/1469* (2013.01); *H04W 88/02* (2013.01)

(58) Field of Classification Search
  CPC ......... H04W 56/0045; H04W 72/0446; H04W 72/0453; H04W 88/02
  USPC .......................................................... 370/254
  See application file for complete search history.

(56) References Cited

U.S. PATENT DOCUMENTS

| | | | |
|---|---|---|---|
| 2011/0274057 A1* | 11/2011 | Kuo | H04L 1/1812 370/329 |
| 2012/0039199 A1* | 2/2012 | Chen | H04L 1/0027 370/252 |
| 2012/0039269 A1* | 2/2012 | Tenny | H04L 5/0042 370/329 |
| 2012/0257569 A1* | 10/2012 | Jang | H04W 76/19 370/328 |
| 2012/0314635 A1* | 12/2012 | Lee | H04L 5/001 370/311 |
| 2013/0012186 A1* | 1/2013 | Kim | H04L 5/003 455/418 |
| 2013/0114574 A1 | 5/2013 | Ng et al. | |
| 2013/0114576 A1* | 5/2013 | Kwon | H04W 56/0045 370/336 |
| 2013/0136015 A1* | 5/2013 | Ojala | H04L 5/001 370/252 |
| 2013/0188473 A1* | 7/2013 | Dinan | H04W 56/0005 370/216 |
| 2013/0188580 A1* | 7/2013 | Dinan | H04W 52/281 370/329 |
| 2013/0279377 A1* | 10/2013 | Zhao | H04L 5/001 370/280 |
| 2013/0329704 A1* | 12/2013 | Lee | H04J 3/1694 370/336 |
| 2013/0343239 A1* | 12/2013 | Damnjanovic | H04L 5/001 370/280 |
| 2014/0044092 A1* | 2/2014 | Guan | H04W 72/0413 370/330 |
| 2014/0079033 A1* | 3/2014 | Bergstrom | H04W 56/0045 370/336 |
| 2014/0119207 A1 | 5/2014 | Yamada | |
| 2014/0295909 A1* | 10/2014 | Ouchi | H04W 52/242 455/522 |
| 2015/0098370 A1* | 4/2015 | Lee | H04L 1/1671 370/280 |
| 2015/0146698 A1* | 5/2015 | Uchino | H04W 56/00 370/336 |
| 2015/0257160 A1* | 9/2015 | Ishida | H04W 72/0486 455/452.1 |
| 2016/0044638 A1* | 2/2016 | Gao | H04W 72/042 370/280 |
| 2016/0234706 A1* | 8/2016 | Liu | H04L 5/0048 |
| 2017/0170941 A1* | 6/2017 | Yang | H04W 76/18 |
| 2017/0230953 A1* | 8/2017 | Xu | H04W 52/02 |

* cited by examiner

[Fig. 1]
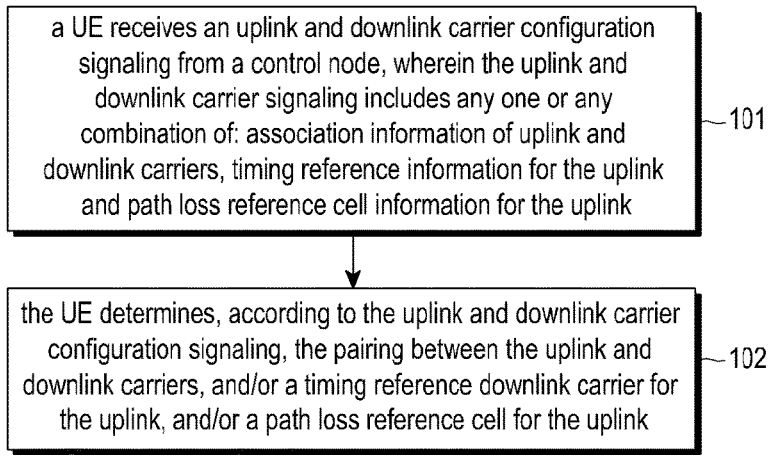
[Fig. 2]
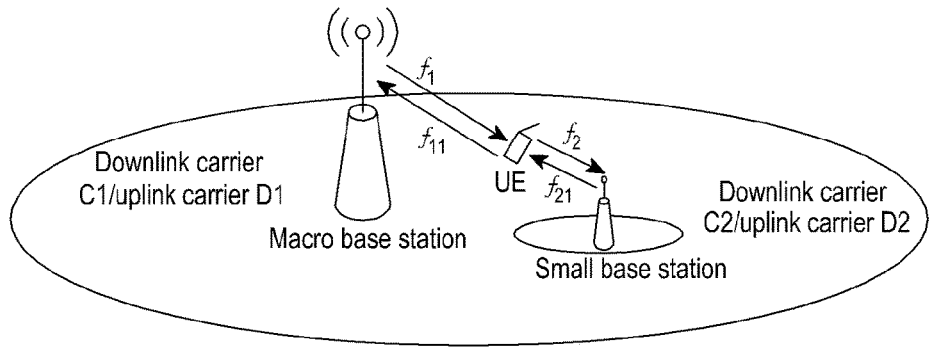
[Fig. 3]
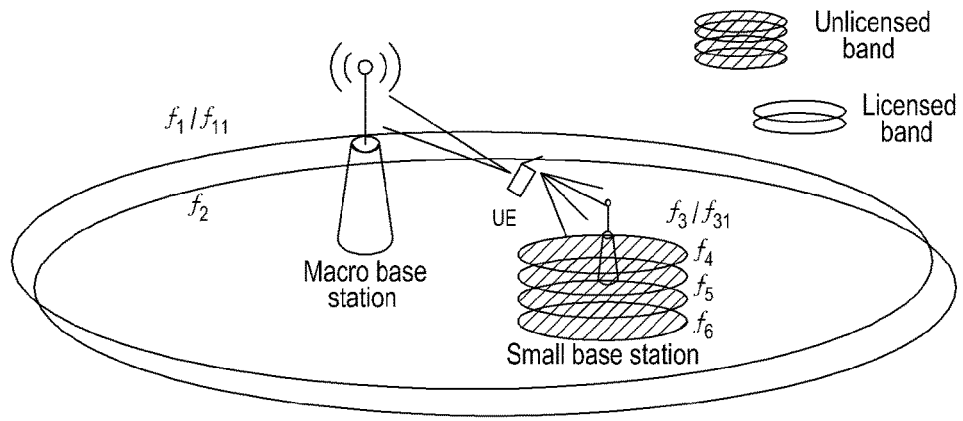

[Fig. 4]
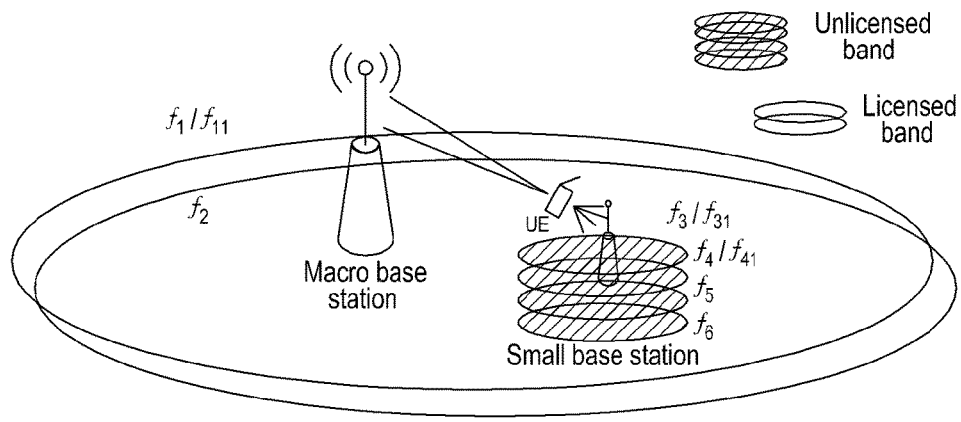
[Fig. 5]
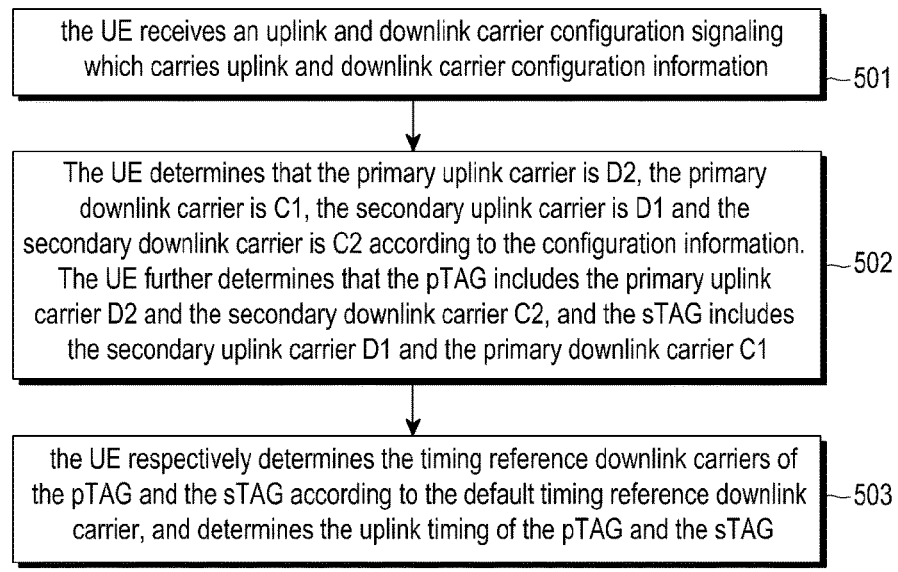
[Fig. 6]
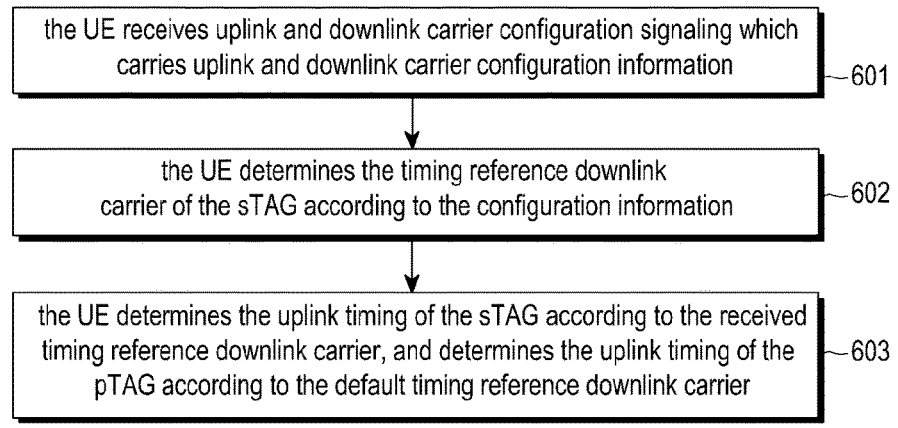

[Fig. 7]
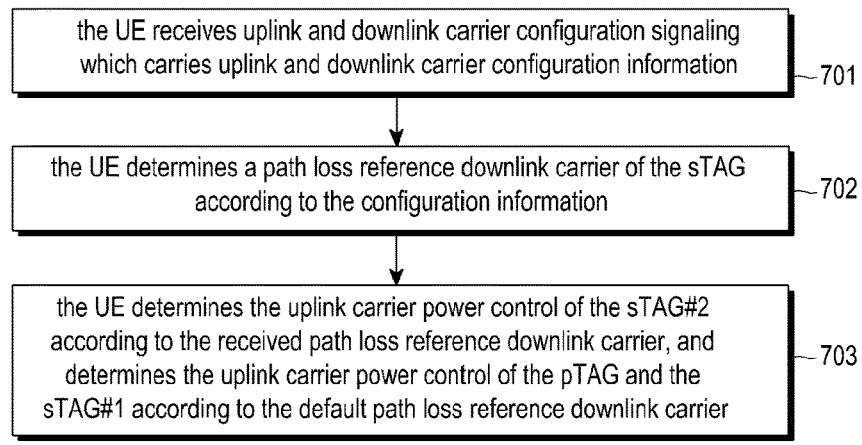
[Fig. 8]
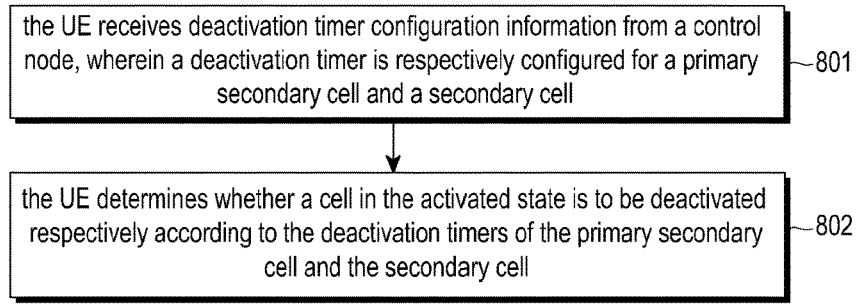
[Fig. 9]
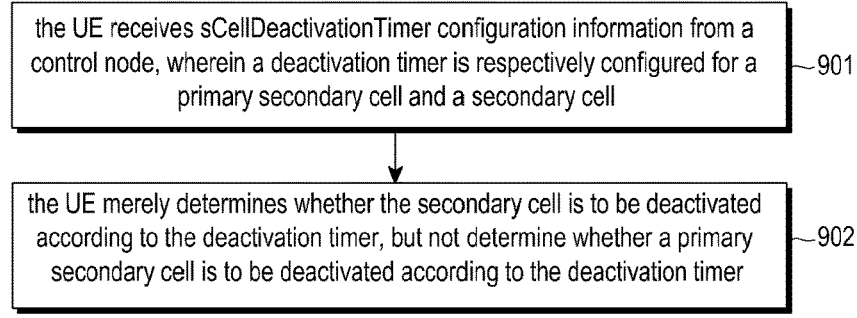
[Fig. 10]
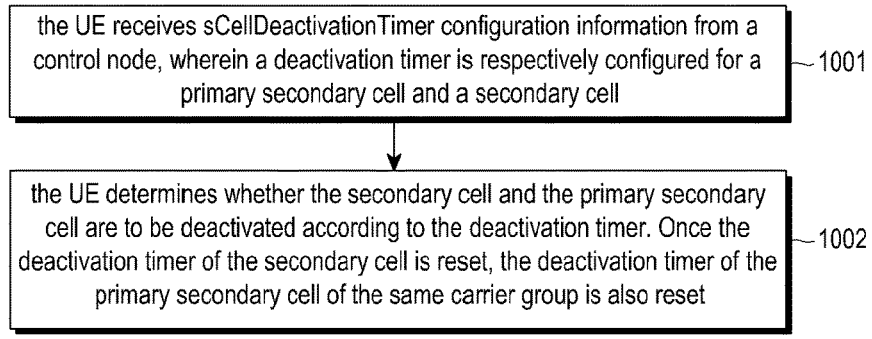

[Fig. 11]
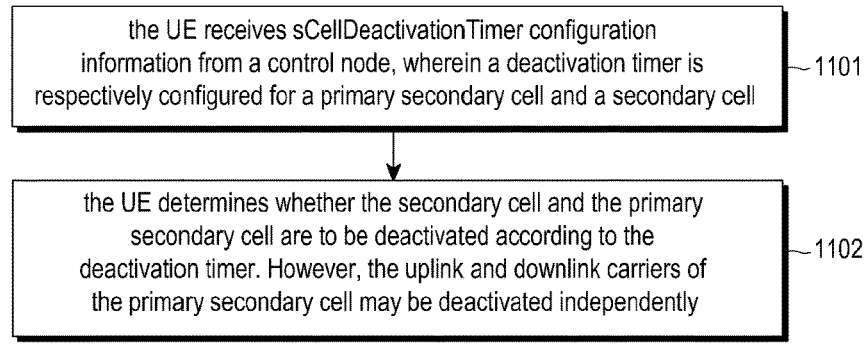
[Fig. 12]
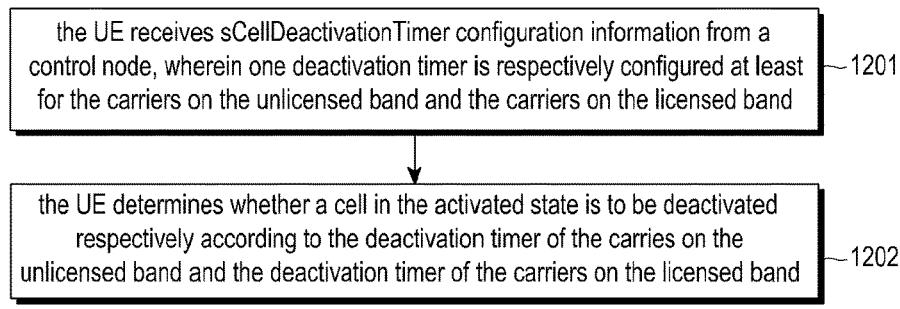
[Fig. 13]
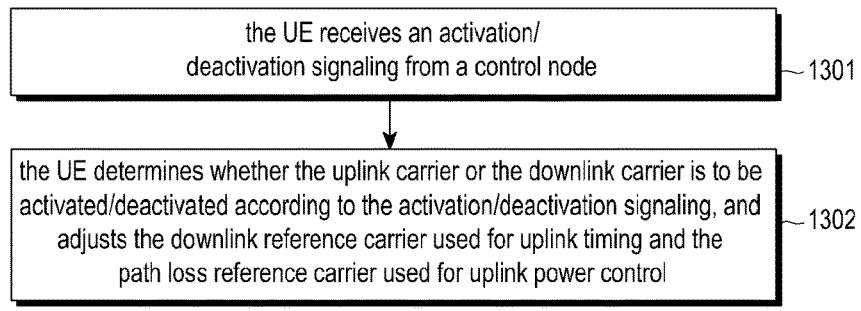
[Fig. 14]
[Fig. 15]
[Fig. 16]

METHOD AND APPARATUS FOR CONFIGURATION UPLINK AND DOWNLINK CARRIERS

CROSS-REFERENCE TO RELATED APPLICATION(S)

This application is a National Phase Entry of PCT International Application No. PCT/KR2015/014345, which was filed on Dec. 28, 2015, and claims priority to Chinese Patent Application No. 201410833839.3, which was filed on Dec. 26, 2014, the entire disclosure of each of which is hereby incorporated by reference.

TECHNICAL FIELD

The present disclosure relates to mobile communication techniques, and more particularly, to a method and an apparatus for configuring uplink and downlink carriers.

BACKGROUND

With increasing demand of wideband wireless services, it is a trend to aggregate more carriers to realize a higher peak rate. Meanwhile, due to the re-planning of the spectrum and the newly-emerged available spectrum, deployment of a Long Term Evolution (LTE) system on unlicensed band is under research. In the LTE system, there is a technique which aggregates multiple carriers on different frequency bands to sufficiently utilize the spectrum resources. On the unlicensed band of the LTE system, e.g., on the 5 GHz unlicensed band, there are hundreds megabytes of available frequency bands which are able to support more than 5 carriers at the same time. For another example, on the 3.5 GHz unlicensed band, at least 2 carriers may be supported at the same time. Therefore, in order to effectively utilize carriers on each frequency band, limitations of at most 5 carriers and the maximum aggregation bandwidth of 100 MHz in the existing LTE system need to be broken during the research on the carrier aggregation system.

With the increase of the numbers of downlink and/or uplink carriers capable of being aggregated in the carrier aggregation system, the addition of uplink and downlink control signaling is unavoidable. The existing design of the transmission of the uplink and downlink control signaling in the LTE system may be a bottle neck for the performance improvement of the carrier aggregation system. For example, uplink control signaling is transmitted on merely one uplink carrier. With the increase of the number of downlink carriers, the control signaling offload increases greatly, which results in performance decrease of a channel bearing the uplink control signaling, and accordingly data transmission efficiency of the uplink carrier bearing the uplink control signaling is also decreased. Therefore, it is necessary to disperse the uplink control signaling offload to other uplink carriers. For example, the uplink and downlink carriers may be divided into multiple groups. The uplink control signaling of each group is transmitted on one uplink carrier of the group. Thus, this uplink carrier may be seen as a primary carrier of the group, referred to as a primary secondary carrier. With respect to all groups, there is still a special uplink carrier, referred to as a primary carrier. In order to ensure the transmission performance of the uplink control signaling of each group, it is required to select a most reliable carrier to act as the primary secondary carrier, e.g., a carrier on the licensed band. But the carrier on the licensed band and the carrier on the unlicensed band may be unable to act as a reference for each other due to their different geographical locations or a large frequency gap, and the carriers on the licensed band are limited. Therefore, there may be a situation that the primary secondary carrier has to be selected from the unlicensed band. On the unlicensed band, since it is required to avoid interference between the LTE system and other devices working on the unlicensed band, e.g., radar or other wireless devices such as WiFi. The device based on the LTE system needs to perform a Clear Channel Assessment (CCA), i.e., the LTE device has to detect the wireless channel before transmitting uplink control signaling. The wireless channel can be occupied for transmitting uplink control signaling only when it is detected that the wireless channel is clear. If the primary secondary carrier, the uplink or downlink carrier fails to seize the channel for a long period, the carrier may be not effective, e.g., deactivated, or may be unable to provide accurate downlink synchronization reference or downlink channel measurement result. At the same time, configurations of paired uplink and downlink carriers in the existing LTE system are bound, e.g. the uplink and downlink carriers of the Pcell belong to the same serving cell, or uplink and downlink carriers of the Scell share the same secondary carrier index. Thus, the ineffectiveness of one downlink or uplink carrier generally results in ineffectiveness of the paired uplink or downlink carrier. Therefore, other carriers in the group may be unable to work normally. In addition, with the gradually development of heterogeneous network, more and more UEs may work in the carrier aggregation mode, wherein at least one pair of uplink and downlink carriers is from a macro base station, and another pair of uplink and downlink carriers is from a small base station. Generally, the UE is closer to the small base station. Therefore, the transmission performance of the uplink control signaling may be improved through feeding back the uplink control signaling to the small base station but not the macro base station which is farer. In the existing LTE system, the uplink and downlink carriers of the macro base station are bound and are selected as the primary uplink and downlink carriers at the same time. Therefore, it cannot be implemented for the UE that the downlink primary carrier is from the macro base station and the uplink primary carrier bearing the uplink control signaling belongs to the small base station.

Therefore, it is necessary to research how to configure the uplink and downlink carriers more flexibly, reduce the impact of the paired uplink and downlink carriers which are unable to work normally on normal operating carriers, and reduce the impact on other carriers.

It should be noted that, the description of the above background is merely to provide a clear and complete description for the technical solution of the present disclosure and to facilitate understand of those with ordinary skill in the art. The above technical solution should not be regarded as well-known for those with ordinary skill in the art merely because they are described in the background of the disclosure.

SUMMARY

Embodiments of the present disclosure provide a method for configuring uplink and downlink carriers, so as to configuring uplink and downlink carriers flexibly, support carrier aggregation performance more effectively and improve the performance of the LTE system.

Embodiments of the present disclosure also provide an apparatus for configuring uplink and downlink carriers, so as to configuring uplink and downlink carriers flexibly, support carrier aggregation performance more effectively and improve the performance of the LTE system.

In order to realize the above objective, the present disclosure provides a technical solution as follows. A method for configuring uplink and downlink carriers, including: receiving, by a User Equipment UE, an uplink and downlink carrier configuration signaling; wherein the uplink and downlink carrier configuration signaling comprises any one or any combination of: association information of uplink and downlink carriers, timing reference information for the uplink, and pathloss reference cell information for the uplink; and determining, by the UE according to uplink and downlink carrier configuration signaling, the pairing between the uplink and downlink carriers; and/or a timing reference downlink carrier for the uplink; and/or a pathloss reference cell for the uplink.

A method for activating/deactivating uplink and downlink carriers, including: receiving, by a User Equipment UE, activation/deactivation configuration information, determining an implicit or an explicit activation/deactivation manner; determining, by the UE, a cell state and/or states of uplink and downlink carriers of a cell according to an activation/deactivation parameter in the information.

A control node for configuring uplink and downlink carriers, including: a configuring unit and a transmitting unit; wherein the configuring unit is adapted to configure an uplink and downlink carrier configuration signaling, wherein the uplink and downlink carrier configuration signaling comprises any one or any combination of: association information of uplink and downlink carriers, timing reference information for the uplink, and pathloss reference cell information for the uplink; the transmitting unit is adapted to transmit the uplink and downlink carrier configuration signaling.

A UE for configuring uplink and downlink carriers, including: a receiving unit and a processing unit; wherein the receiving unit is adapted to receive an uplink and downlink carrier configuration signaling, wherein the uplink and downlink carrier configuration signaling comprises any one or any combination of: association information of uplink and downlink carriers, timing reference information for the uplink, and pathloss reference cell information for the uplink; and the processing unit is adapted to determine, according to the uplink and downlink carrier configuration signaling, the pairing between the uplink and downlink carriers, and/or, a reference downlink carrier for the uplink carrier, and/or a pathloss reference cell for the uplink.

An apparatus for activating/deactivating uplink and downlink carriers, including: a second receiving unit and a second processing unit; wherein the second receiving unit is adapted to receive activation/deactivation configuration information, determine an implicit or an explicit activation/deactivation manner; and the second processing unit is adapted to determine a cell state and/or states of uplink and downlink carriers of a cell according to an activation/deactivation parameter in the activation/deactivation configuration information.

It can be seen from the above technical solution that, the UE in the embodiments of the present disclosure determines according to the uplink and downlink carrier configuration signaling, the pairing between the uplink and downlink carriers; and/or, determine a timing reference downlink carrier for the uplink; and/or determine a pathloss reference cell for the uplink. Thus, the uplink and downlink carriers may be configured more flexibly. Thus, the uplink and downlink carriers may be configured more flexibly. Further, through the configuration of the reference downlink carrier for the uplink timing and the uplink power control, the carrier aggregation performance and that on the unlicensed band may be supported more effectively, so as to improve the performance of the LTE system.

BRIEF DESCRIPTION OF DRAWINGS

FIG. 1 is a flowchart illustrating a method for configuring uplink and downlink carriers according to an embodiment of the present disclosure.

FIG. 2 is a schematic diagram illustrating a first scenario based on the method as shown in FIG. 1 according to an embodiment of the present disclosure, wherein an active UE operating in the carrier aggregation system is adopted.

FIG. 3 is a schematic diagram illustrating a second scenario based on the method as shown in FIG. 1 according to an embodiment of the present disclosure, wherein an active UE operating in the carrier aggregation system is adopted.

FIG. 4 is a schematic diagram illustrating a third scenario based on the method as shown in FIG. 1 according to an embodiment of the present disclosure, wherein an active UE operating in the carrier aggregation system is adopted.

FIG. 5 is a flowchart illustrating a method based on the scenario as shown in FIG. 2 according to an embodiment of the present disclosure.

FIG. 6 is a flowchart illustrating a method based on the scenario as shown in FIG. 3 according to an embodiment of the present disclosure.

FIG. 7 is a flowchart illustrating a method based on the scenario as shown in FIG. 4 according to an embodiment of the present disclosure.

FIG. 8 is a flowchart illustrating a first implicit deactivating method according to an embodiment of the present disclosure.

FIG. 9 is a flowchart illustrating a second implicit deactivating method according to an embodiment of the present disclosure.

FIG. 10 is a flowchart illustrating a third implicit deactivating method according to an embodiment of the present disclosure.

FIG. 11 is a flowchart illustrating a fourth implicit deactivating method according to an embodiment of the present disclosure.

FIG. 12 is a flowchart illustrating a fifth implicit deactivating method according to an embodiment of the present disclosure.

FIG. 13 is a flowchart illustrating a sixth explicit deactivating method according to an embodiment of the present disclosure.

FIG. 14 is a schematic diagram illustrating a structure of a control node according to an embodiment of the present disclosure.

FIG. 15 is a schematic diagram illustrating a structure of a UE according to an embodiment of the present disclosure.

FIG. 16 is a schematic diagram illustrating an apparatus for activating/deactivating uplink and downlink carriers according to an embodiment of the present disclosure.

DETAILED DESCRIPTION

The present disclosure is described in further detail hereinafter with reference to accompanying drawings and embodiments to make the objective, technical solution and merits therein clearer.

FIG. 1 is a flowchart illustrating a method for configuring uplink and downlink carriers according to an embodiment of the present disclosure. The method includes the following.

At block 101, a UE receives an uplink and downlink carrier configuration signaling from a control node, wherein the uplink and downlink carrier configuration signaling contains any one or any combination of: association information of uplink and downlink carriers, timing reference information for the uplink and pathloss reference cell information for the uplink.

At block 102, the UE determines, according to the uplink and downlink carrier configuration signaling, the pairing between the uplink and downlink carriers, and/or a timing reference downlink carrier (timing reference cell) for the uplink, and/or a pathloss reference cell (pathlossReferenceLinking cell) for the uplink.

In this method, the control node may be a base station or a UE having a control function in a carrier aggregation system. In the embodiments of the present disclosure, the base station is taken as an example.

Hereinafter, FIG. 1 is described in detail with reference to three scenarios, which are respectively shown in FIG. 2, FIG. 3 and FIG. 4.

FIG. 2 is schematic diagram illustrating a first scenario based on the method as shown in FIG. 1 according to an embodiment of the present disclosure, wherein an active UE operating in the carrier aggregation system is adopted. In this scenario: the base station configures 2 downlink carriers and 2 uplink carriers for the UE, wherein a macro base station downlink carrier C1 is operating on frequency f1, a small base station downlink carrier C2 is operating on frequency f2. System information (System Information Block 2, SIB2) of the macro base station downlink carrier C1 indicates that a corresponding uplink carrier is D1 on frequency f11. The SIB2 of the downlink carrier C2 indicates that a corresponding uplink carrier is D2 on frequency f21. Since the two carriers are under different control nodes, the two carriers belong to different Timing Advance Groups (TAGs) in this embodiment.

FIG. 3 is a schematic diagram illustrating a second scenario based on the method as shown in FIG. 1 according to an embodiment of the present disclosure, wherein an active UE operating in the carrier aggregation system is adopted. In this scenario: the base station configures 6 downlink carriers and 2 uplink carriers for the UE, wherein macro base station downlink carriers C1 and C2 are respectively operating on frequencies f1 and f2 on a licensed band. The SIB2 of the macro base station downlink carrier C1 indicates that a corresponding uplink carrier is D1 on frequency f11 on the licensed band, whereas downlink carrier C2 has no corresponding uplink carrier. The small base station downlink carriers C3, C4, C5 and C6 are respectively operating on frequencies f3, f4, f5 and f6 on the unlicensed band, and the SIB2 of downlink carrier C3 indicates that a corresponding uplink carrier is D3 on frequency f31 on the unlicensed band, whereas downlink carriers C4, C5 and C6 have no corresponding uplink carriers. Since carriers 1, 2 and carriers 3, 4, 5, 6 are under different control nodes, they belong to different TAGs in this embodiment.

FIG. 4 is a schematic diagram illustrating a third scenario based on the method as shown in FIG. 1 according to an embodiment of the present disclosure, wherein an active UE operating in the carrier aggregation system is adopted. In this scenario: the base station configures 6 downlink carriers and 3 uplink carriers for the UE, wherein the macro base station downlink carriers C1 and C2 are respectively operating on frequencies f1 and f2 on the licensed band. The SIB2 of the macro base station downlink carrier C1 indicates that a corresponding uplink carrier is D1 on frequency f11 on the licensed band, whereas downlink carrier C2 does not have corresponding uplink carrier. The small base station downlink carriers C3, C4, C5 and C6 are respectively operating on frequencies f3, f4, f5 and f6, wherein downlink carrier C3 belongs to the licensed band and downlink carriers C4, C5 and C6 belong to the unlicensed band. The SIB2 of the downlink carrier C3 indicates that a corresponding uplink carrier is D3 on frequency f31 on the licensed band. The SIB2 of the downlink carrier C4 indicates that a corresponding uplink carrier is D4 on frequency f41 on the unlicensed band. But downlink carriers C5 and C6 do not having corresponding uplink carriers. Since carriers 1, 2 and carriers 3, 4, 5, 6 are under different control nodes, they belong to different TAGs in this embodiment. In addition, if the carriers on the licensed band and the carriers on the unlicensed band have a relatively large frequency gap, e.g., 2 GHz and 5 GHz, the carriers operating on two bands under the same control node may also belong to different TAGs, e.g. carrier 3 and carriers 4, 5, 6 may belong to different TAGs.

In this method, the uplink and downlink carrier configuration signaling may include any one or any combination of the following.

A first kind of information: association information of uplink and downlink carriers, or referred to as pairing information of the uplink and downlink carriers.

In particular, for each uplink carrier, there is a corresponding downlink carrier. The association information may include: a primary downlink carrier (PDLCell) and a primary uplink carrier (PULCell), and/or a primary secondary downlink carrier (sPDLCell) and a primary secondary uplink carrier (sPULCell), and/or a secondary downlink carrier (SDLCell) and a secondary uplink carrier (SULCell).

In one implementation, the paired uplink and downlink carriers belong to the same serving cell. For example, for a secondary cell (Scell), the paired SDLCell and the SULCell share the same secondary carrier index (sCellIndex). The pair of uplink and downlink carriers has a particular bounding relationship. For example, in a cross-carrier scheduling, carrier indication fields (CIFs) corresponding to the paired uplink and downlink carriers are the same. In one example, for non-periodic Channel State Information (CSI) report, the non-periodic CSI corresponding to "01" of a non-periodic CSI request field born by uplink scheduling signaling (UL grant) is the paired downlink carrier of the uplink carrier scheduled by the uplink scheduling signaling. However, at least in the uplink power control and the uplink time adjustment procedure, the bounding relationship of the pair of uplink and downlink carriers may be changed via additional signaling.

It should be noted that, in the LTE system, the pairing between the PDLCell and the PULCell is broadcasted by system information (System Information Block 2, SIB2). For the UEs working in the multi-carrier mode and the single-carrier mode, the pairing is unchanged. In the present disclosure, however, the base station may configure the pairing between the PDLCell and the PULCell based on uplink and downlink carrier configuration signaling, e.g., Radio Resource Control (RRC) signaling.

For example, as shown in FIG. 2, the SIB2 of the macro base station downlink carrier C1 indicates that the corresponding uplink carrier is D1, whereas the SIB2 of the small base station downlink carrier C2 indicates that the corresponding uplink carrier is D2. According to the prior art, if the macro base station downlink carrier C1 is a primary downlink carrier, the uplink primary carrier must be the uplink carrier D1. However, the uplink and downlink carrier configuration signaling in the embodiment of the present disclosure may configure the macro base station downlink carrier C1 as the primary downlink carrier and configure the uplink carrier D2 as the primary uplink carrier, i.e., the macro base station downlink carrier C1 and the uplink carrier D2 are configured as paired primary carriers. The small base station downlink carrier C2 is a secondary downlink carrier and the uplink carrier D1 is a secondary uplink carrier, i.e., the small base station downlink carrier C2 and the uplink carrier D1 are configured as paired secondary carriers. Thus, the bounding relationship between the macro base station downlink carrier C1 and the uplink carrier D2 is the same as the bounding relationship between one pair of uplink and downlink carriers corresponding to the same serving cell in the prior art, for example, in cross-carrier scheduling, the CIFs corresponding to the macro base station downlink carrier C1 and the uplink carrier D2 are the same, except for some particular bounding relationship configured by the additional uplink and downlink carrier configuration signaling in the present disclosure, e.g., the pathloss downlink reference carrier in the uplink power control of the small base station uplink carrier D2 may be not the downlink carrier C1.

In another implementation, the paired uplink and downlink carriers belong to different serving cells. The pair of uplink and downlink carriers has a new bounding relationship which may be configured via additional uplink and downlink configuration signaling. For example, the base station configures two serving cells for the UE, one is a pair of uplink and downlink carriers of the macro base station, and the other is a pair of uplink and downlink carriers of the small base station. The pair of uplink and downlink carriers of one serving cell still shares one cell index, e.g., the same PCI or sCellIndex, but the base station may configure the downlink carrier C1 as the primary downlink carrier and configure the small base station uplink carrier D2 as the primary uplink carrier.

Herein, the association information of uplink and downlink carriers is configured by higher layer signaling explicitly. The association relationship of the uplink and downlink carriers may be the same as or different from association relationship of uplink and downlink carriers indicated by downlink system information.

A second kind of information: timing reference information for the uplink, including at least one or any combination of the following situations:

(1) Information of TAGs that the uplink and downlink carriers respectively belong to. The timing reference information may include: TAGs that the paired uplink and downlink carriers respectively belong to, and/or the TAGs that the primary downlink carrier and the primary uplink carrier respectively belong to; and/or, the TAGs that the primary secondary downlink carrier and the primary secondary uplink carrier respectively belong to; and/or the TAGs that the secondary downlink carrier and the secondary uplink carrier respectively belong to. In particular, the primary downlink carrier and the primary uplink carrier may belong to different TAGs, and/or the primary secondary downlink carrier and the primary secondary uplink carrier may belong to different TAGs; and/or the secondary downlink carrier and the secondary uplink carrier may belong to different TAGs.

In the prior art, the paired uplink and downlink carriers belong to the same TAG. For example, the primary uplink and downlink carriers belong to a primary TAG (pTAG) in default, which requires no configuration. The secondary uplink and downlink carriers are configured into one secondary TAG (sTAG) at the same time. In the prior art, the TAG is configured taking the Scell as a unit. Therefore, the paired uplink and downlink carriers belonging to the same Scell are configured at the same time.

In this embodiment, the TAGs that the primary uplink and downlink carriers belong to may be configured respectively. For example, for one implementation of the first kind of information, primary uplink and downlink carriers different from the indication of the SIB2may be configured to belong to the same cell (sharing the same SevrCellIndex 0). Thus, it may be regarded in default that the primary uplink carrier belongs to pTAG, whereas the TAG that the primary downlink carrier belongs to is configured by the uplink and downlink carrier configuration signaling received by the UE, e.g. explicit signaling. If the uplink and downlink carrier configuration signaling is not configured, the primary uplink and downlink carriers belong to the same pTAG. The TAGs that the primary secondary downlink carrier and the primary secondary uplink carrier belong to and/or the TAGs that the secondary downlink carrier and the secondary uplink carrier belong to may be respectively configured via explicit signaling. For the implementations that the paired uplink and downlink carriers belong to the same serving cell and different serving cells, the signaling for configuring the TAGs may be different.

(2) Timing reference downlink carrier (timing reference cell) for an uplink carrier.

The timing reference downlink carrier may belong to a TAG different from that of the uplink carrier.

In the prior art, the timing reference downlink carrier for the pTAG is the primary downlink carrier, and the timing reference downlink carrier for the sTAG is any downlink carrier in the same TAG. In this embodiment, a downlink carrier in a different TAG may be selected as the timing reference downlink carrier. For example, if the TAG is configured following the prior art, i.e. the paired uplink and downlink carriers belong to the same TAG, e.g. the macro base station downlink carrier C1 and uplink carrier D2 as shown in FIG. 1 belong to the same pTAG, since the two carriers are located in different physical positions and have different propagation delays, the uplink timing adjustment of the uplink carrier D2 is performed based on downlink carrier D2 instead of the downlink carrier C1. Thus, the downlink carrier C2 may be configured as the timing reference downlink carrier for the uplink carrier D2 at this time.

In particular, two implementation manners may be adopted.

In a first implementation manner, the timing reference downlink carrier of the uplink carrier is configured by the base station. In one embodiment, there are four methods for the base station to implement the configuration.

In a first method for the base station to implement the configuration, uplink and downlink carrier configuration signaling configured by the base station indicates that the timing reference downlink carrier of the primary uplink carrier is the primary downlink carrier or an initial paired downlink carrier. Herein, the relationship between the primary uplink carrier and the paired downlink carrier may be broadcasted by the SIB2of the downlink carrier, or indicated by system information of the primary uplink carrier and the downlink carrier transmitted via higher layer signaling. The signaling may be as follows:

TimingReferenceLinking ENUMERATED {pCell, sCell};

wherein pCell denotes that the timing reference downlink carrier of the primary uplink carrier is the primary downlink carrier, sCell denotes that the timing reference downlink carrier of the primary uplink carrier is the initial paired downlink carrier. It should be noted that, the name of the above signaling, e.g. "TimingReferenceLinking" or "pCell", "sCell" are merely examples of the present disclosure.

For example, as show in FIG. 2, the SIB2 of the macro base station downlink carrier C1 indicates that the corresponding uplink carrier is D1, and the SIB2 of the small base station downlink carrier C2 indicates that the corresponding uplink carrier is D2. The macro base station downlink carrier C1 and the uplink carrier D2 are respectively primary uplink and downlink carriers. As to the primary uplink carrier D2, the base station configures the primary downlink carrier C1 or the SIB2 linked downlink carrier C2 as its timing reference downlink carrier. If the UE initially operates in the single-carrier mode, the uplink and downlink carriers are respectively D1 and C1, the base station configures the uplink and downlink carriers D2 and C2 to the UE through adding the Scell. The base station transmits system information including the SIB2 on the small base station downlink carrier D2 to the UE via higher layer signaling, wherein the corresponding uplink carrier information is also included. In this situation, as to the primary uplink carrier D2, the base station configures the primary downlink carrier C1 or the downlink carrier C2 indicated in the higher layer signaling as the timing reference downlink carrier. If the pTAG includes not only the primary uplink carrier but also secondary uplink carriers, all uplink carriers in the pTAG use the same downlink carrier as the timing reference downlink carrier. Herein, if the base station does not configure the timing reference downlink carrier for the primary uplink carrier or the pTAG, it may be regarded that the prior art is followed, e.g., the timing reference downlink carrier is the primary downlink carrier or is a default one defined in advance, e.g. a downlink carrier linked with the primary uplink carrier via SIB2.

In a second method for the base station to implement the configuration, the uplink and downlink carrier configuration signaling configured by the base station indicates that the timing reference downlink carrier of the secondary uplink carrier is the primary secondary downlink carrier or is a paired downlink carrier. The signaling may be applicable for one uplink carrier or a group of uplink carriers, e.g., all uplink carriers belong to the same TAG. The signaling may be as follows:

TimingReferenceLinking ENUMERATED {pSCell, sCell};

wherein pSCell denotes that the timing reference downlink carrier of the primary uplink carrier is the primary secondary downlink carrier, sCell denotes that the timing reference downlink carrier is an initial paired downlink carrier. It should be noted that, the name of the signaling "TimingReferenceLinking", or "pSCell", "sCell" are merely some examples.

Herein, the primary secondary downlink carrier and the secondary uplink carrier may belong to the same or different TAGs.

If the UE works on the unlicensed band, there is a possibility that all carriers in one sTAG are on the unlicensed band. Since the channel on the unlicensed band may be unable to be occupied during a long period, the downlink reference timing may be inaccurate. Therefore, more accurate downlink reference timing may be obtained based on the downlink carrier on the licensed band. The carrier on the licensed band and the carrier on the unlicensed band may belong to the same TAG. As shown in FIG. 4, the downlink carriers C1 and C2 of the macro base station may form a carrier group G1. The downlink carrier C3 and downlink carriers C4, C5, C6 are all downlink carriers of the small base station. Downlink carriers C3, C4, C5, C6 may form another carrier group G2, wherein downlink carrier C1 and uplink carrier D1 belong to the Pcell, downlink carrier C3 and uplink carrier D3 belong to the sPcell. If the propagation characteristic of the licensed carrier C3/D3 is similar to that of the unlicensed carriers C4/D4, C5, C6, these carriers may be configured to belong to the same sTAG. Thus, the base station may configure the primary secondary downlink carrier C3 as the timing reference downlink carrier for the sTAG. Therefore, all uplink carriers D3/D4 in the sTAG take the downlink carrier C3 as the timing reference downlink carrier. It is also possible that the carriers on the licensed band and carriers on the unlicensed band are not in the same TAG, even if for a co-located scenario. For example, if the propagation characteristic of licensed carrier C3/D3 and that of the unlicensed carrier C4/D4 have a big difference, the two pairs of carriers are configured to belong to different sTAGs and adopting different timing advance $N_{TA}$. But uplink carrier D4 may take the downlink carrier C3 as the timing reference downlink carrier, so as to ensure the accuracy of the downlink reference timing. In this example, all uplink carriers in the carrier group G2 may take the primary secondary carrier C3 as the timing reference downlink carrier, even if the primary secondary downlink carrier C3 and the secondary uplink carrier belong to different TAGs.

In a third method for the base station to implement the configuration, the uplink and downlink carrier configuration signaling configured by the base station indicates that the timing reference downlink carrier of the secondary uplink carrier is the primary secondary downlink carrier, or is any downlink carrier in the same TAG. The signaling may be applicable for one uplink carrier or a group of uplink carriers, e.g., applicable for all uplink carriers belonging to the same TAG. The signaling may be as follows:

TimingReferenceLinking ENUMERATED {pSCell, sCell};

wherein pSCell denotes that the timing reference downlink carrier of the secondary uplink carrier is the primary secondary downlink carrier, sCell denotes that the timing reference downlink carrier is any downlink carrier in the same TAG. It should be noted that, the name of the signaling such as "TimingReferenceLinking", or "pSCell", "sCell" are merely some examples.

More flexibly, the uplink and downlink carrier configuration signaling configured by the base station may indicate the timing reference downlink carrier for one uplink carrier or all uplink carriers in the TAG. The timing reference downlink carrier indicated by the signaling may be any activated or configured downlink carrier. In this situation, the UE may select a preferred downlink carrier according to a practical situation, e.g. a cell in the on state or a cell which transmits signals used for downlink synchronization most frequently.

In a fourth method for the base station to implement the configuration, the base station may indicate the timing reference downlink carrier configured for one uplink carrier or a group of uplink carriers through indicating a cell identifier of the cell that the timing reference downlink carrier belongs to, wherein the cell identifier includes but is not limited to: Physical Cell Identifier (PCID), or serving cell index, or secondary cell ID ScellID or SCellIndex of the timing reference downlink carrier, or cell index of the timing reference downlink carrier in the carrier group. The signaling may be as follows:

TimingReferenceLinking ServCellIndex;

wherein the ServCellIndex denotes the cell index of the indicated timing reference downlink carrier. It should be noted that, the name of the signaling such as "TimingReferenceLinking", or "ServCellIndex" are merely some examples In a second implementation, the timing reference downlink carrier for an uplink carrier on the unlicensed band is fixed to be the primary downlink carrier or the corresponding primary secondary downlink carrier; or, if the TAG that the uplink carrier on the unlicensed band belongs to includes at least one downlink carrier on the licensed band, the timing reference downlink carrier is fixed to be the downlink carrier on the licensed band, otherwise, the timing reference downlink carrier is any downlink carrier in the same TAG; or, if the TAG that the uplink carrier on the unlicensed band belongs to includes at least one downlink carrier on the licensed band, the timing reference downlink carrier is fixed to be the downlink carrier on the licensed band, otherwise, the timing reference downlink carrier is the primary secondary downlink carrier of the same carrier group; or, if the TAG that the uplink carrier on the unlicensed band includes the primary secondary downlink carrier, the timing reference downlink carrier is fixed to be the primary secondary downlink carrier, otherwise the timing reference downlink carrier is any downlink carrier in the same TAG; or, if the TAG that the uplink carrier on the unlicensed band belongs to includes the primary secondary downlink carrier, the timing reference downlink carrier is fixed to be the primary secondary downlink carrier, otherwise the timing reference downlink carrier is the primary secondary downlink carrier of the same carrier group.

The base station may also provide assistance information for obtaining the uplink timing based on the timing reference downlink carrier. For example, a time offset may be indicated while indicating the timing reference downlink carrier. The time offset may be included in the existing TA Command (TAC), or may be newly defined indication information. The time offset may be an offset with respect to the current uplink transmission time, or an offset with respect to current downlink timing reference.

As shown in FIG. 3, the timing reference downlink carrier of uplink carrier D3 on the unlicensed band is fixed to be the primary downlink carrier C1. Still referring to FIG. 3, all carriers of the small base station form a carrier group, and the downlink carrier C3 and uplink carrier D3 on the licensed band are the primary secondary carrier of the carrier group. Thus, the timing reference downlink carrier of the uplink carrier D4 on the unlicensed band is fixed to be the primary secondary downlink carrier C3.

A third kind of information: pathloss reference cell (PathlossReference cell) information for the uplink. The pathloss reference cell is used for determining reference signal power (referenceSignalPower) and higher layer filtered RSRP, so as to determine a pathloss variable in uplink power control, $PL_c$= referenceSignalPower–higher layer filtered RSRP.

Any one or any combination of the following situations is included.

The pathloss reference cell information indicates pathloss reference cell information of a primary uplink carrier. In one embodiment, the base station has two manners to implement the configuration.

In a first manner for the base station to implement the configuration, the information configured by the base station indicates that the pathloss reference cell of the primary uplink carrier is the paired downlink carrier, or is the primary downlink carrier. Herein, the relationship between the primary uplink carrier and the paired downlink carrier may be broadcasted by SIB2 of the downlink carrier, or indicated by the system information of the primary uplink carrier and the downlink carrier transmitted by higher layer signaling.

The signaling may be as follows:

pathlossReferenceLinking ENUMERATED {pCell, sCell};

wherein pCell denotes that the pathloss reference cell of the primary uplink carrier is the primary downlink carrier, sCell denotes that the pathloss reference cell of the primary uplink carrier is the initial paired downlink carrier. It should be noted that, the name of the signaling such as "pathlossReferenceLinking", or "pCell", "sCell" are merely some examples.

In a second manner for the base station to implement the configuration, the information configured by the base station indicates one downlink carrier as the pathloss reference cell, the base station indicates via a cell identifier of the pathloss reference cell. The cell identifier includes but is not limited to: Physical Cell ID (PCID), or serving cell index (ServCellIndex), or secondary cell ID (ScellID or SCellIndex) of the pathloss reference cell, or cell index of the pathloss reference cell in the carrier group. The signaling may be as follows:

pathlossReferenceLinking ServCellIndex;

wherein ServCellIndex denotes an index of the pathloss reference cell. It should be noted that, the name of the signaling such as "pathlossReferenceLinking" or "ServCellIndex" are merely some examples.

The timing reference downlink carrier indicated by the signaling may be any activated downlink carrier, or a configured downlink carrier. The configured downlink carrier may be an activated or deactivated downlink carrier. Different configurations may be applicable for different scenarios. For example, if the downlink carrier has semi-static on/off function, after being deactivated, merely a Discovery Reference Signal (DRS) is transmitted. For the CRS-based DRS in a high interference scenario, the accuracy ratio of the measured RSRP is decreased. Thus, it is better to configure the activated downlink carrier as the timing reference downlink carrier. For another example, if CRS may be transmitted on each carrier after the downlink carrier is deactivated, the deactivated downlink carrier may also be configured as the timing reference downlink carrier.

Herein, if the base station does not configure the pathloss reference cell for the primary uplink carrier or the pTAG, a default configuration defined in advance may be followed, e.g., a downlink carrier linked with the primary uplink carrier via SIB2 may be utilized.

(2) The pathloss reference cell information indicates a pathloss reference cell of an uplink carrier in the sTAG. The signaling may indicate the pathloss reference cell applicable for one uplink carrier, or a group of uplink carriers, e.g., all uplink carriers belonging to the same sTAG. In one embodiment, there are four manners for the base station to implement the configuration.

In a first manner for the base station to implement the configuration, the pathloss reference cell of the uplink carrier is the paired downlink carrier, or any downlink carrier in the same TAG.

The signaling may be as follows:

pathlossReferenceLinking ENUMERATED {pCell, sCell};

wherein pCell denotes that the pathloss reference cell of the primary uplink carrier is the primary downlink carrier, sCell denotes that the pathloss reference cell of the primary uplink carrier is any downlink carrier in the same TAG. It should be noted that, the name of the signaling such as "pathlossReferenceLinking", or "pCell", "sCell" are merely some examples.

In a second manner for the base station to implement the configuration, the configuration information transmitted by the base station indicates that, the pass loss reference cell of the uplink carrier is the paired downlink carrier, or a primary secondary downlink carrier in a same or different TAG of the same carrier group.

The signaling may be as follows:

pathlossReferenceLinking ENUMERATED {pSCell, sCell};

wherein pSCell denotes that the pathloss reference cell of the primary uplink carrier is the primary secondary downlink carrier of the same carrier group, sCell denotes that the pathloss reference cell of the primary uplink carrier is any downlink carrier in the same TAG. It should be noted that, the name of the signaling such as "pathlossReferenceLinking", or "pSCell", "sCell" are merely some examples.

In a third manner for the base station to implement the configuration, the configuration information transmitted by the base station indicates that the pathloss reference cell of the uplink carrier is the paired downlink carrier, or the primary downlink carrier. Herein, the relationship between the primary uplink carrier and the paired downlink carrier may be broadcasted by the SIB2 of the downlink carrier, or indicated by system information of the primary uplink carrier and the downlink carrier transmitted by higher layer signaling.

The signaling may be as follows:

pathlossReferenceLinking ENUMERATED {pCell, sCell};

wherein pCell denotes that the pathloss reference cell of the primary uplink carrier is the primary downlink carrier, sCell denotes that the pathloss reference cell of the primary uplink carrier is the paired downlink carrier. It should be noted that, the name of the signaling such as "pathlossReferenceLinking", or "pCell", "sCell" are merely some examples.

In a fourth manner for the base station to implement the configuration, the configuration information transmitted by the base station indicates one downlink carrier as the pathloss reference cell. The base station may indicate via the cell identifier of the pathloss reference cell, wherein the cell identifier includes but is not limited to: Physical Cell ID (PCID), or serving cell index (ServCellIndex), or secondary cell ID (ScellID or SCellIndex) of the pathloss reference cell, or cell index of the pathloss reference cell in the carrier group. The signaling may be as follows:

pathlossReferenceLinking ServCellIndex;

wherein ServCellIndex denotes an index of the indicated pathloss reference cell. It should be noted that, the name of the signaling such as "pathlossReferenceLinking" or "ServCellIndex" are merely some examples.

The pathloss reference cell indicated by the signaling may be any activated or configured downlink carrier. The configured downlink carrier may be an activated or deactivated downlink carrier.

Herein, if the base station does not configure the pathloss reference cell for the secondary uplink carrier or sTAG, the prior art may be adopted to determine, e.g., the downlink carrier linked with the secondary uplink carrier via SIB2 as the pathloss reference cell.

In the prior art, the pathloss reference cell of the primary uplink carrier is the primary downlink carrier. But in a scenario of the present disclosure, as shown in FIG. 2, if the macro base station downlink carrier C1 is the primary downlink carrier and the uplink carrier D2 is the primary uplink carrier, the downlink carrier C2 of the same base station with the uplink carrier D2 is selected as the pathloss reference cell, although the downlink carrier C2 is the secondary downlink carrier. Also see FIG. 3, all carriers of the small base station belong to the same TAG. The downlink carrier C3 on the unlicensed band may be unable to be used for transmitting reference signals for RSRP measurement due to unable to seize channel for a long time period, which results that the pass loss estimation provided by the uplink carrier D3 is inaccurate. Therefore, if other downlink carriers of the same TAG can obtain a relatively accurate RSRP result, the downlink carrier may provide pathloss estimation reference for the uplink carrier D3. Thus, any downlink carrier in the same TAG may be configured for the uplink carrier D3. The UE may select one downlink carrier as the pathloss reference cell according to the RSRP measurement accuracy requirement. See FIG. 4 for another example, all carriers of the small base station form one carrier group and downlink carrier C3 and uplink carrier D3 on the licensed band are the primary secondary carrier of the carrier group. The downlink carrier C4 on the unlicensed band may be unable to be used for transmitting reference signals for RSRP measurement due to unable to seize channel for a long time period, which results that the pass loss estimation provided by the uplink carrier D4 is inaccurate. Therefore, the primary secondary downlink carrier C3 may be configured as the pathloss reference cell for the uplink carrier D4.

(3) The pathloss reference cell of the uplink carrier on the unlicensed band is fixed to be the downlink carrier on the licensed band in the same TAG; or, the pathloss reference cell of the uplink carrier on the unlicensed band is fixed to be the primary secondary downlink carrier of the same TAG, or, the pathloss reference cell of the uplink carrier on the unlicensed band is fixed to be the primary secondary downlink carrier in the same or different TAGs of the same carrier group.

The base station may also provide assistance information for obtaining the pathloss required for the uplink carrier power control based on the pathloss reference cell. For example, when indicating the pathloss reference cell, it is possible to indicate an uplink power control offset or downlink pathloss offset. Through the offset and the RSRP of the pathloss reference cell, the UE may obtain the pathloss value required for the uplink power control. For another example, when the pathloss reference cell is indicated, a set of parameters used for uplink power control may be indicated, e.g., open loop power control parameters such as Po, $\alpha$, or close loop power control parameters. For example, the PUSCH uplink power control is determined by the following formula:

$$P_{PUSCH,c}(i) = \min \left\{ \begin{array}{c} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array} \right\}$$

wherein $PL_c$ denotes the downlink pathloss of the pathloss reference cell in the prior art. In this embodiment, the pathloss is the downlink pathloss $PL_n$ of the pathloss reference cell indicated by the uplink and downlink carrier configuration signaling, then the PUSCH uplink power control is determined by the following formula:

$$P_{PUSCH,c}(i) = \min \left\{ \begin{array}{l} P_{CMAX,c}(i), \\ 10\log_{10}(M_{PUSCH,c}(i)) + P_{O\_PUSCH,c}(j) + \\ \alpha_c(j) \cdot PL_n + \Delta_{TF,c}(i) + f_c(i) \end{array} \right\}$$

If the uplink and downlink carrier configuration signaling further indicates the assistance information for obtaining the pathloss required for the uplink carrier power control based on the pathloss reference cell, e.g. the pathloss offset $\Delta PL_n$, then the PUSCH uplink power control is determined according to the formula:

$$P_{PUSCH,c}(i) = \min \left\{ \begin{array}{l} P_{CMAX,c}(i), \\ 10\log_{10}(M_{PUSCH,c}(i)) + P_{O\_PUSCH,c}(j) + \\ \alpha_c(j) \cdot (PL_n + \Delta_{PLn}) + \Delta_{TF,c}(i) + f_c(i) \end{array} \right\}$$

For another example, if the uplink and downlink carrier configuration signaling further indicates that the assistance information for obtaining the pathloss required for the uplink carrier power control based on the pathloss reference cell is $\alpha_n(j)$, then the PUSCH uplink power control is determined by the following formula:

$$P_{PUSCH,c}(i) = \min \left\{ \begin{array}{l} P_{CMAX,c}(i), \\ 10\log_{10}(M_{PUSCH,c}(i)) + P_{O\_PUSCH,c}(j) + \\ \alpha_n(j) \cdot PL_n + \Delta_{TF,c}(i) + f_c(i) \end{array} \right\}$$

In FIG. 1 of the present disclosure, the uplink and downlink carrier configuration signaling in block 101 may be RRC signaling or MAC layer signaling or physical layer signaling.

Hereinafter, two examples are given to describe the whole procedure of FIG. 1.

FIRST EXAMPLE

When determining the primary uplink carrier, the UE determines the primary uplink carrier and feeds back uplink control information of all or some carriers on the primary uplink carrier.

The UE determines the TAGs that the primary uplink carrier and the primary downlink carrier belong to. The TAG containing the primary uplink carrier is defined as a pTAG. The UE determines the timing reference downlink carrier of the primary uplink carrier, and adopts the same TA and the same timing reference downlink carrier for all uplink carriers belonging to the pTAG including the primary uplink carrier and other secondary uplink carriers. The UE adjusts the uplink transmission timing according to the downlink timing of the timing reference downlink carrier and the received TAC, i.e., uplink radio frame i of the uplink carrier is transmitted before $(N_{TA}+N_{TA\ offset}) \times T_s$ seconds of the downlink radio frame of the timing reference downlink carrier, wherein $N_{TA}$ is timing advance, $N_{TA\ offset}$ is timing advance offset. In the prior art, $N_{TA\ offset}=0$ for the FDD system, and $N_{TA\ offset}=624$ for the TDD system, $T_s$ is a sampling frequency in the LTE system.

The UE determines the pathloss reference cell of the primary uplink carrier. The UE determines referenceSignalPower and higher layer filtered RSRP according to the pathloss reference cell, so as to determine PL=referenceSignalPower−higher layer filtered RSRP. The UE calculates primary uplink carrier transmission power according to the pathloss.

SECOND EXAMPLE

When determining the primary secondary uplink carrier/secondary uplink carrier, the UE determines the primary secondary uplink carrier and feeds back uplink control information of all carriers of the same carrier group on the primary secondary uplink carrier.

The UE determines that the sTAGs that each primary secondary uplink carrier and secondary uplink carrier belongs to; the UE determines the timing reference downlink carrier of each sTAG and adopts the same TA and the same timing reference downlink carrier for all uplink carriers belonging to the sTAG. The UE adjusts the uplink transmission time according to the downlink timing of the timing reference downlink carrier and the received TAC, i.e., uplink radio frame i of the uplink carrier is transmitted before $(N_{TA}+N_{TA\ offset}) \times T_s$ seconds of the downlink radio frame of the timing reference downlink carrier, wherein $N_{TA}$ is timing advance, $N_{TA\ offset}$ is timing advance offset. In the prior art, $N_{TA\ offset}=0$ for the FDD system, and $N_{TA\ offset}=624$ for the TDD system, $T_s$ is a sampling frequency in the LTE system. In each sTAG, uplink reference signal used for establishing initial uplink synchronization may be transmitted on at least one uplink carrier, e.g., Physical Random Access Channel (PRACH). The PRACH is transmitted on the uplink carrier before $(N_{TA}+N_{TA\ offset}) \times T_s$ seconds of the downlink radio frame of the timing reference downlink carrier, wherein $N_{TA}=0$, or $N_{TA}$ may be determined according to the assistance information configured by the base station. For example, if the assistance information includes a timing offset, $N_{TA}$ may be configured to be the offset. It should be noted that the offset and the $N_{TA\ offset}$ in the prior art are two independent variables. Herein, if the base station changes the timing reference downlink carrier, the base station may trigger the UE to transmit the PRACH according to the downlink receiving time of the new timing reference downlink carrier, or the base station may indicate assistance information for obtaining uplink timing according to the timing reference downlink carrier when changing the timing reference downlink carrier, e.g., uplink timing advance offset, and the $N_{TA}$ of the UE may be reset to the received uplink timing advance offset.

The UE determines the pathloss reference cell of the uplink carrier. The UE determines referenceSignalPower and higher layer filtered RSRP according to the pathloss reference cell, so as to determine PL=reference-SignalPower−higher layer filtered RSRP. The UE calculates primary uplink carrier transmission power according to the pathloss.

In the present disclosure, if the base station does not transmit the corresponding configuration information, the UE performs corresponding operations according to the prior art or a default configuration defined in advance.

FIG. 5 is a flowchart illustrating a method based on the scenario as shown in FIG. 2 according to an embodiment of the present disclosure. In the scenario as shown in FIG. 2, the base station configures two pairs of uplink and downlink carriers for the UE. The base station transmits configuration information of the primary uplink and downlink carriers and secondary uplink and downlink carriers for the two pairs of uplink and downlink carriers to the UE, and configures a TAG respectively for the four carriers. For example, the primary uplink carrier D2 belongs to pTAG in default, no TAG information is configured for the secondary downlink carrier C2 and thus it belongs to the pTAG in default. The primary uplink carrier D1 is configured to belong to sTAG, and the secondary uplink carrier D2 is configured to belong to the sTAG. The detailed operations include the following.

At block 501, the UE receives an uplink and downlink carrier configuration signaling which carries uplink and downlink carrier configuration information.

The configuration information is different from the carrier configuration information in the prior art. Herein, the configuration information configures primary uplink carrier and primary downlink carrier different from the paired relationship indicated by the SIB2. Further, TAGs are respectively configured for the uplink and downlink carriers of one cell.

At block 502, the UE determines that the primary uplink carrier is D2, the primary downlink carrier is C1, the secondary uplink carrier is D1 and the secondary downlink carrier is C2 according to the configuration information. The UE further determines that the pTAG includes the primary uplink carrier D2 and the secondary downlink carrier C2, and the sTAG includes the secondary uplink carrier D1 and the primary downlink carrier C1.

At block 503, the UE respectively determines the timing reference downlink carriers of the pTAG and the sTAG according to the default timing reference downlink carrier, and determines the uplink timing of the pTAG and the sTAG.

The base station does not configure a special timing reference downlink carrier. Therefore, the UE regards that the default one is utilized. For example, the timing reference downlink carrier may be a downlink carrier in the same TAG. Thus, when the UE transmits PRACH on the primary uplink carrier D2, the timing reference downlink carrier is C2. When the UE transmits PRACH on the secondary uplink carrier D1, the timing reference downlink carrier is C1. Further, the subsequent uplink timing is always based on the corresponding timing reference downlink carrier, until the UE receives new configuration information for the timing reference downlink carrier.

FIG. 6 is a flowchart illustrating a method based on the scenario as shown in FIG. 3 according to an embodiment of the present disclosure. As shown in FIG. 3, carriers C1/D1 and C2 belong to one TAG, and carriers C3/D3, C4, C5 and C6 belong to another TAG. Suppose that the primary uplink and downlink carriers are D1/C1, there is no primary secondary carrier, thus other carriers are all secondary carriers. The uplink control signaling of all carriers are transmitted on the uplink carrier D1. Carriers C1/D1 and C2 belong to the pTAG. And carriers C3/D3, C4, C5 and C6 belong to the sTAG. The detailed operations include the following.

At block 601, the UE receives uplink and downlink carrier configuration signaling which carries uplink and downlink carrier configuration information.

The difference between the configuration information in the present disclosure and that in the prior art relies in that the timing reference downlink carrier of the sTAG is configured in the configuration information in the present disclosure.

The base station configures the primary uplink and downlink carriers according to the prior art, i.e., no additional signaling is required. The uplink carrier corresponding to the primary downlink carrier indicated by SIB2 is the primary uplink carrier. When configuring the TAG, the base station takes each cell as a unit according to the prior art, i.e., the uplink and downlink carriers of one cell belong to the same TAG. In this embodiment, carriers C1/D1 and C2 belong to the pTAG, and carriers C3/D3, C4, C5 and C6 belong to the sTAG.

At block 602, the UE determines the timing reference downlink carrier of the sTAG according to the configuration information.

If the base station does not explicitly configure the timing reference downlink carrier for the pTAG, the UE regards that a default one is utilized. For example, the timing reference downlink carrier of the pTAG is the primary downlink carrier C1. If the base station explicit configures that the timing reference downlink carrier of the sTAG, e.g. the primary downlink carrier C1, the UE determines that the timing reference downlink carrier of the sTAG is C1 according to the configuration.

At block 603, the UE determines the uplink timing of the sTAG according to the received timing reference downlink carrier, and determines the uplink timing of the pTAG according to the default timing reference downlink carrier.

When the UE transmits PRACH on the primary uplink carrier D1, the timing reference downlink carrier is C1. If the UE transmits PRACH on the secondary uplink carrier D3, the timing reference downlink carrier is C1. Further, the subsequent uplink timing of the sTAG and the pTAG is always based on the primary downlink carrier C1, until the UE receives new configuration information of the timing reference downlink carrier.

It should be noted that, in this embodiment, the timing reference downlink carrier of the sTAG is the downlink carrier of another TAG, i.e., pTAG. Through taking the downlink carrier on the licensed band as a reference, it is avoided that the carrier on the unlicensed band is unable to seize the channel in time and therefore affects the downlink synchronization accuracy ratio.

FIG. 5 and FIG. 6 are flowcharts showing some combinations of the embodiments of the present disclosure. For example, if the base station configures for the UE both the TAGs for the uplink and downlink carriers and also the timing reference downlink carrier of the uplink carrier, the UE determines the timing reference downlink carrier according to the configured timing reference downlink carrier of the uplink carrier. For example, the base station configures the TAGs, i.e., pTAG and sTAG respectively for the primary uplink carrier and the primary downlink carriers via RRC signaling. Thus, the timing reference downlink carrier of the primary uplink carrier is a downlink carrier in the same TAG. Meanwhile, the base station configures the timing reference downlink carrier, e.g. primary downlink carrier for the primary uplink carrier via physical layer signaling. Thus, the UE determines that the timing reference downlink carrier of the primary uplink carrier is the primary downlink carrier according to the physical layer signaling.

FIG. 7 is a flowchart illustrating a method based on the scenario as shown in FIG. 4 according to an embodiment of the present disclosure. In the scenario as shown in FIG. 4, the primary uplink and downlink carriers are D1/C1. Carriers C1/D1 and C2 belong to the same carrier group and the same TAG, i.e., pTAG. The uplink control signaling of carriers C1/D1/C2 is transmitted on the primary uplink carrier D1. Carriers C3/D3, C4/D4, C5 and C6 belong to another carrier, wherein D3/C3 are primary secondary uplink and downlink carriers on the licensed band, and C4/D4, C5, C6 are on the unlicensed band. The uplink control signaling of carriers C3/D3, C4/D4, C5 and C6 is transmitted on the primary secondary uplink carrier D3. Carriers C3/D3 belong to sTAG #1, and carriers C4/D4, C5, C6 belong to sTAG #2.

At block 701, the UE receives uplink and downlink carrier configuration signaling which carries uplink and downlink carrier configuration information.

The difference between the configuration information in the present disclosure and that in the prior art relies in that the timing reference downlink carrier of the sTAG is configured in the configuration information in the present disclosure.

The base station configures the primary uplink and downlink carriers according to the prior art, i.e., no additional signaling is required. The uplink carrier corresponding to the primary downlink carrier indicated by SIB2 is the primary uplink carrier. When configuring the TAG, the base station takes each cell as a unit according to the prior art, i.e., the uplink and downlink carriers of one cell belong to the same TAG.

At block 702, the UE determines a pathloss reference downlink carrier of the sTAG according to the configuration information.

Suppose that the base station explicitly configures the pathloss reference downlink carrier for merely the sTAG #2, but does not configure the pathloss reference downlink carrier for the sTAG #1 and the pTAG. The UE determines the pathloss reference downlink carrier of the pTAG and the sTAG #1 according to a default configuration, e.g., the pathloss reference downlink carrier of the pTAG may be the primary downlink carrier C1, and the pathloss reference downlink carrier of the sTAG #1 may be the paired primary secondary downlink carrier C3 of the uplink carrier D3. The UE determines the pathloss reference downlink carrier of the sTAG #2 is C3 according to the received configuration, e.g., the configuration that the base station configures the primary secondary downlink carrier C3 as the pathloss reference downlink carrier of sTAG #2.

At block 703, the UE determines the uplink carrier power control of the sTAG #2 according to the received pathloss reference downlink carrier, and determines the uplink carrier power control of the pTAG and the sTAG #1 according to the default pathloss reference downlink carrier.

The UE calculates the downlink pathloss according to the pathloss reference downlink carrier determined in block 702, and determines the uplink transmission power of the uplink carrier according to the calculated pathloss until the UE receives new configuration information of the pathloss reference carrier.

If the UE also receives assistance information for obtaining the pathloss required for the uplink carrier power control based on the pathloss reference cell, e.g., pathloss offset, the UE determines the uplink power control according to a combination of the pathloss offset and the pathloss of the pathloss reference cell.

It should be noted that, in this embodiment, the pathloss reference downlink carrier of the uplink carrier D4 of the sTAG #2 is neither the paired downlink carrier C4 nor the primary downlink carrier C1, but the primary secondary downlink carrier C3. Through configuring a downlink carrier of the same base station and operating on the licensed band, an accurate and reliable pathloss reference may be provided.

The description in the above embodiments of the present disclosure is based on the Frequency Division Duplex (FDD) and paired uplink and downlink carriers are carriers on different frequencies. The embodiments are also applicable for Time Division Duplex (TDD) system. At this time, the paired uplink and downlink carriers are the same carrier, the uplink and downlink are differentiated by subframes, and the TDD uplink/downlink configuration of different carriers may be the same or different. Further, the embodiments are also applicable for carrier aggregation scenarios of the FDD and TDD. For example, as shown in FIG. 2, if it is the TDD system, there are two carrier altogether, i.e., a carrier on frequency f1 and a carrier on frequency f2. Downlink subframes of the carrier on the frequency f1 may be configured by higher layer as primary downlink carrier, and uplink subframes of the carrier on the frequency f2 may be configured as primary uplink carrier. For another example, as shown in FIG. 2, the macro base station carriers may be of the FDD system, wherein downlink carrier C1 and uplink carrier D2 are respectively the uplink and downlink carriers of the FDD system. The small base station carriers are of the TDD system, one carrier on frequency f2, the uplink and downlink subframes are respectively uplink and downlink of the TDD system. Thus, the timing reference downlink carrier of the uplink carrier on frequency f2 may be configured as the primary downlink carrier C1 via signaling configuration.

In the present disclosure, a method for activating/deactivating the uplink and downlink carriers is further provided. The method includes: receiving, by the UE, activating/deactivating configuration information, determining an implicit or explicit activating/deactivating manner; and determining, by the UE, a cell state and/or states of uplink and downlink carriers of a cell according to an activating/deactivating parameter in the activating/deactivating configuration information. In the prior art, if the UE is configured with one or more secondary cells, the base station may activate and deactivate a configured cell. The base station may activate/deactivate a secondary cell for the UE via activation/deactivation MAC control element, i.e., explicit activation/deactivation. Further, the base station may configure a deactivation timer sCellDeactivationTimer for the UE. The UE maintains the timer for each secondary cell. If the deactivation timer expires, the UE deactivates the corresponding secondary cell. The deactivation timer may be configured by RRC signaling and an initial value of the timer of each secondary cell may be the same. Such a deactivation manner is an implicit deactivation manner.

Whether the explicit or the implicit activation/deactivation manner is adopted, if a cell includes both a downlink carrier and an uplink carrier, the activation/deactivation is effective for both the uplink and downlink carriers.

In the present disclosure, the uplink and downlink carriers of a cell may be activated/deactivated respectively. On the other hand, different processing manners may be adopted for the primary secondary cell and the secondary cell, so as to ensure the effective transmission of the uplink carrier which bears the uplink control information.

Hereinafter, examples are provided to describe the method for activating/deactivating the uplink and downlink carriers.

In a first example, an implicit deactivating method is as shown in FIG. 8, the method includes the following.

At block 801, the UE receives deactivation timer (sCellDeactivationTimer) configuration information from a control node, wherein a deactivation timer is respectively configured for a primary secondary cell and a secondary cell.

For the UE configured with a primary secondary cell, the base station configures a deactivation timer for the primary secondary cell and the secondary cell respectively, i.e., initial values of the deactivation timers of the primary secondary cell and the secondary cell may be different. If the UE is configured merely with the primary cell and the secondary cell, the base station configures merely one deactivation timer for all secondary cells according to the prior art.

At block 802, the UE determines whether an associated cell (i.e. the primary secondary cell or the secondary cell) in the activated state is to be deactivated respectively according to the deactivation timer of the associated cell.

In this block, if the deactivation timer of the associated cell expires, the UE deactivates the associated cell. Once the corresponding cell is deactivated, the corresponding uplink and downlink carriers are deactivated at the same time.

Since the primary secondary uplink carrier not only bears data transmission but also bears the uplink control signaling of all carriers in one carrier group, it is required to ensure that the primary secondary uplink and downlink carriers are in the activated state as much as possible, i.e., even if the primary secondary uplink and downlink carriers have a relatively light load or unable to seize channel to transmit downlink signal during a long time. Through configuring deactivation timers respectively for the primary secondary cell and the secondary cell, the effectiveness of the uplink carrier of the primary secondary cell may be ensured well. Once the cell is deactivated, uplink signals cannot be transmitted on the uplink carriers of the cell, including PUSCH, PUCCH, SRS and PRACH.

FIG. 9 is a flowchart illustrating a second implicit deactivation method according to an embodiment of the present disclosure. The method includes the following.

At block 901, the UE receives sCellDeactivationTimer configuration information from a control node, wherein the configuration information includes merely one deactivation timer.

At block 902, the UE merely determines whether the secondary cell is to be deactivated according to the deactivation timer, but not determine whether a primary secondary cell is to be deactivated according to the deactivation timer, i.e., the UE determines whether the primary secondary cell is to be deactivated according to the explicit deactivation signaling transmitted by the base station.

Herein, when the deactivation timer of the secondary cell expires, the UE deactivates the secondary cell. When the UE receives the deactivation signaling, the UE deactivates the primary secondary cell. Once the corresponding cell is deactivated, the corresponding uplink and downlink carriers are both deactivated at the same time.

Through this method, the primary secondary cell is deactivated merely via the explicit deactivation signaling, e.g., existing MAC layer deactivation signaling, or new physical layer deactivation signaling. The implicit deactivation manner based on the deactivation timer is not adopted, so as to avoid unnecessary deactivation.

FIG. 10 is a flowchart illustrating a third implicit deactivation method according to an embodiment of the present disclosure. The method includes the following.

At block 1001, the UE receives sCellDeactivationTimer configuration information from a control node, wherein the configuration information includes merely one deactivation timer.

At block 1002, the UE determines whether the secondary cell and the primary secondary cell are to be deactivated according to the deactivation timer. However, the reset methods of the deactivation timer for the secondary cell and the primary secondary cell are different. For the secondary cell, according to the prior art, when the UE receives uplink grant or downlink assignment of the secondary cell in the activate state, or when the UE receives an activate signaling, the UE resets the deactivation timer of the secondary cell. For the primary secondary cell, the deactivation timer may be reset if any one of the above two conditions is met. Besides, the deactivation timer of the primary secondary cell may also be reset when the timer of another secondary cell in the same carrier group is reset. For example, if the secondary cell has downlink data transmission, whether the primary secondary cell has downlink or uplink scheduling in the current subframe, the timer of the primary secondary cell is reset. Or when another secondary cell of the same carrier group has downlink data transmission, the deactivation timer of the primary secondary cell is reset.

When the deactivation timer of the associated cell expires, the UE deactivates the associated cell. Herein, once the corresponding cell is deactivated, the corresponding uplink and downlink carriers are both deactivated.

Through this method, even if the primary secondary cell has no downlink transmission for a long time, if another secondary cell of the same carrier group has downlink data transmission, the primary secondary cell may be kept in the activated state, so as to ensure normal uplink transmission.

FIG. 11 is a flowchart illustrating a fourth implicit deactivation method according to an embodiment of the present disclosure. The method includes the following.

At block 1101, the UE receives sCellDeactivationTimer configuration information from a control node, wherein the configuration information includes merely one deactivation timer.

At block 1102, the UE determines whether the secondary cell and the primary secondary cell are to be deactivated according to the deactivation timer. However, the uplink and downlink carriers of the primary secondary cell may be deactivated independently, i.e., when the deactivation timer expires, the UE deactivates merely the downlink carrier but keep the uplink carrier in the activated state. The downlink reference carrier for the uplink timing and the pathloss reference carrier used for the uplink power control may be changed to predefined downlink carriers automatically, or the base station may re-configure, e.g. according to any manner as shown in FIG. 8.

FIG. 12 is a flowchart illustrating a fifth implicit deactivation method according to an embodiment of the present disclosure. The method includes the following.

At block 1201, the UE receives sCellDeactivationTimer configuration information from a control node, wherein one deactivation timer is respectively configured at least for carriers on the unlicensed band and carriers on the licensed band.

At block 1202, the UE determines whether a cell in the activated state is to be deactivated respectively according to the deactivation timer of the carries on the unlicensed band and the deactivation timer of the carriers on the licensed band.

Herein, if the deactivation timer of the cell expires, the UE deactivates the associated cell. Once the cell is deactivated, the corresponding uplink and downlink carries are deactivated at the same time.

FIG. 13 is a flowchart illustrating an explicit uplink and downlink carrier activating/deactivating method according to a sixth embodiment of the present disclosure.

At block 1301, the UE receives an activation/deactivation signaling from a control node.

The activation/deactivation signaling may be an existing MAC layer activation/deactivation signaling, or a physical layer activation/deactivation signaling, wherein the physical layer activation/deactivation signaling may activate/deactivate multiple uplink or downlink carriers at the same time.

The activation/deactivation signaling may respectively indicate whether an uplink carrier or a downlink carrier of a cell is to be activated/deactivated.

At block 1302, the UE determines whether the uplink carrier or the downlink carrier is to be activated/deactivated according to the activation/deactivation signaling, and adjusts the downlink reference carrier used for uplink timing and the pathloss reference carrier used for uplink power control.

The activation/deactivation may further include: the downlink reference carrier used for the uplink timing and the pathloss reference carrier used for the uplink power control. For example, if merely the uplink carrier is activated and the paired downlink carrier is not activated, it is required to configure a downlink reference carrier used for the uplink timing of the activated uplink carrier and configure a pathloss reference carrier used for the uplink power control of the activated uplink carrier. If the reference downlink carrier is not configured, the reference downlink carrier may be determined according to a predefined rule.

In embodiments of the present disclosure, FIG. 14 is a schematic diagram illustrating a structure of a control node according to an embodiment of the present disclosure. The control node includes: a configuring unit and a transmitting unit; wherein the configuring unit is adapted to configure an uplink and downlink carrier configuration signaling, wherein the uplink and downlink carrier configuration signaling includes any one or any combination of: association information of uplink and downlink carriers, timing reference information for the uplink, and pathloss reference cell information for the uplink; the transmitting unit is adapted to transmit the uplink and downlink carrier configuration signaling.

FIG. 15 is a schematic diagram illustrating a structure of a UE according to an embodiment of the present disclosure. The UE includes: a receiving unit and a processing unit; wherein the receiving unit is adapted to receive uplink and downlink carrier configuration signaling; wherein the uplink and downlink carrier configuration signaling includes any one or any combination of: association information of uplink and downlink carriers, timing reference information for the uplink, and pathloss reference cell information for the uplink; and the processing unit is adapted to determine, according to the uplink and downlink carrier configuration signaling, the pairing between the uplink and downlink carriers, and/or a timing reference downlink carrier for the uplink; and/or a pathloss reference cell for the uplink.

FIG. 16 is a schematic diagram illustrating a structure of an apparatus for activating/deactivating uplink and downlink carriers according to an embodiment of the present disclosure. The apparatus includes: a second receiving unit, adapted to receive activation/deactivation configuration information, determine an implicit or an explicit activation/deactivation manner; and a second processing unit, adapted to determine a cell state and/or states of an uplink carrier and a downlink carrier of a cell according to an activation/deactivation parameter in the activation/deactivation configuration information.

The foregoing descriptions are only preferred embodiments of this disclosure and are not for use in limiting the protection scope thereof. Any changes and modifications can be made by those skilled in the art without departing from the spirit of this disclosure and therefore should be covered within the protection scope as set by the appended claims.

The invention claimed is:

1. A method for configuring uplink and downlink carriers, comprising:
   receiving, by a user equipment (UE), an uplink and downlink carrier configuration signaling, wherein the uplink and downlink carrier configuration signaling comprises association information of uplink and downlink carriers, timing reference information for the uplink, and pathloss reference cell information for an uplink; and
   determining, by the UE according to the uplink and downlink carrier configuration signaling, pairing between the uplink and downlink carriers, a timing reference downlink carrier for the uplink, and a pathloss reference cell for the uplink,
   wherein the association information of the uplink and downlink carriers comprises: association information of a primary downlink carrier and a primary uplink carrier or association information of a primary secondary downlink carrier and a primary secondary uplink carrier,
   wherein the association information of the uplink and downlink carriers is explicitly configured by higher layer signaling, and
   wherein the timing reference information for the uplink comprises: information of timing advance groups (TAGs) that the uplink and downlink carriers belong to, or information of the timing reference downlink carrier for the uplink.

2. The method of claim 1,
   wherein the information of the TAGS that the uplink and downlink carriers belong to comprises: TAGs that paired uplink and downlink carriers respectively belong to, TAGs that a primary downlink carrier and a primary uplink carrier respectively belong to, TAGs that a primary secondary downlink carrier and a primary secondary uplink carrier belong to, or TAGs that a secondary downlink carrier and a secondary uplink carrier belong to, and
   wherein the TAGs that the primary downlink carrier and the primary uplink carrier respectively belong to are configured to be different TAGs and that the primary secondary downlink carrier and the primary secondary uplink carrier respectively belong to are configured to be different TAGS and that the secondary downlink carrier and the secondary uplink carrier respectively belong to are configured to be different TAGs.

3. The method of claim 1,
   wherein the information of the timing reference downlink carrier for the uplink comprises: a timing reference downlink carrier configured for an uplink carrier, or a fixed timing reference downlink carrier configured for an uplink carrier on an unlicensed band,
   wherein the timing reference downlink carrier is configured for the uplink carrier by:
      configuring a primary downlink carrier or a paired downlink carrier as the timing reference downlink carrier of a primary uplink carrier; or configuring a primary secondary downlink carrier or a paired downlink carrier as the timing reference downlink carrier of a secondary uplink carrier; or
      configuring a primary secondary downlink carrier or any downlink carrier in the same TAG as the timing reference downlink carrier of a secondary uplink carrier; or
      indicating a cell identifier of a cell to which the timing reference downlink carrier belongs to identify the timing reference downlink carrier, and wherein the fixed timing reference downlink carrier is configured for the uplink carrier on the unlicensed band by:
fixedly configuring a primary downlink carrier or a corresponding primary secondary downlink carrier as the timing reference downlink carrier; or
if a TAG that the uplink carrier on the unlicensed band belongs to includes at least one downlink carrier on a licensed band, fixedly configuring the downlink carrier on the licensed band as the timing reference downlink carrier; otherwise, configuring any downlink carrier in the same TAG as the timing reference downlink carrier; or
if the TAG that the uplink carrier on the unlicensed band belongs to includes at least one downlink carrier on the licensed band, fixedly configuring the downlink carrier on the licensed band as the timing reference downlink carrier, otherwise, configuring a primary secondary downlink carrier in a same carrier group as the timing reference downlink carrier; or
if the TAG that the uplink carrier on the unlicensed band belongs to includes a primary secondary downlink carrier, fixedly configuring the primary secondary downlink carrier as the timing reference downlink carrier; otherwise, configuring any downlink carrier in a same TAG as the timing reference downlink carrier; or
if the TAG that the uplink carrier on the unlicensed band belongs to includes a primary secondary downlink carrier, fixedly configuring the primary secondary downlink carrier as the timing reference downlink carrier; otherwise, configuring a primary secondary downlink carrier in a same carrier group as the timing reference downlink carrier.

4. The method of claim 1, further comprising: receiving assistance information of uplink timing while receiving the information of the timing reference downlink carrier for the uplink, wherein the assistance information comprises at least a time offset.

5. The method of claim 1,
wherein the pathloss reference cell information for the uplink comprises: information of a pathloss reference cell configured for a primary uplink carrier, information of a pathloss reference cell configured for an uplink carrier in a secondary TAG (sTAG), or information of a pathloss reference cell fixedly configured for an uplink carrier on an unlicensed band,
wherein information of the pathloss reference cell is configured for the primary uplink carrier by:
indicating a paired downlink carrier, or indicating a primary downlink carrier; or
indicating any activated downlink carrier or a configured downlink carrier as the timing reference downlink carrier, wherein the configured downlink carrier is an activated or deactivated downlink carrier; or
indicating a cell identifier of a cell that the pathloss reference cell belongs to,
wherein the information of the pathloss reference cell is configured for the uplink carrier in the sTAG by:
indicating a paired downlink carrier or any downlink carrier in the same TAG as the pathloss reference cell for the uplink carrier; or
indicating a paired downlink carrier or a primary secondary downlink carrier which belongs to the same carrier group but a different TAG as the pathloss reference cell for the uplink carrier; or
indicating a paired downlink carrier or a primary downlink carrier as the pathloss reference cell for the uplink carrier; or indicating a cell identifier of a cell that the pathloss reference cell belongs to, and
wherein the information of the pathloss reference cell is fixedly configured for the uplink carrier on the unlicensed band by:
fixedly configuring a downlink carrier on a licensed band of the same TAG as the pathloss reference cell; or
fixedly configuring a primary secondary downlink carrier of the same TAG as the pathloss reference cell; or
fixedly configuring a primary secondary downlink carrier of the same carrier group but a different TAG as the pathloss reference cell.

6. The method of claim 5, further comprising: receiving assistance information of pathloss required for uplink carrier power control while receiving the pathloss reference cell information for the uplink;
wherein the assistance information of the pathloss required for the uplink carrier power control comprises at least: an uplink power control offset or a downlink pathloss offset, a set of uplink open-loop power control parameters, or a set of uplink close-loop power control parameters.

7. The method of claim 1, further comprising:
when determining the timing reference downlink carrier for the uplink or determining the pathloss reference cell for the uplink, if the UE does not receive a primary uplink carrier configuration signaling or a timing reference downlink carrier for a primary TAG (pTAG), or a primary uplink carrier configuration signaling or a pathloss reference cell for the pTAG, determining, by the UE, the timing reference downlink carrier for the uplink or the pathloss reference cell for the uplink according to a default configuration, wherein the default configuration comprises a downlink carrier linked with the primary uplink carrier via system information block (SIB)2.

8. A method for activating/deactivating uplink and downlink carriers, comprising:
receiving, by a user equipment (UE), activation/deactivation configuration information, wherein the activation/deactivation configuration information further comprises information of a timing reference downlink carrier used for uplink timing and information of a pathloss reference carrier used for uplink power control;
determining an implicit or an explicit activation/deactivation manner;
determining, by the UE, a cell state or states of uplink and downlink carriers of a cell according to an activation/deactivation parameter in the information; and
adjusting, by the UE, a downlink reference carrier used for the uplink timing and the pathloss reference carrier used for the uplink power control according to the activation/deactivation configuration information.

9. The method of claim 8, wherein the activation/deactivation configuration information comprises deactivation timer configuration information, wherein deactivation timer and an initial timer value are respectively configured for a primary secondary cell and a secondary cell;
the determining the cell state comprises: respectively determining whether the secondary cell and the primary secondary cell in an activated state is to be deactivated according to deactivation timers of the primary secondary cell and the secondary cell respectively, if the deactivation timer of the secondary cell or the secondary primary cell expires, deactivating, by the UE, the secondary cell or the secondary primary cell, or wherein the activation/deactivation configuration information comprises configuration information of one deactivation timer;

the determining the cell state comprises: determining whether the secondary cell is to be deactivated according to the deactivation timer but not determining whether the primary secondary cell is to be deactivated according to the deactivation timer; if the deactivation timer of the secondary cell expires, deactivating, by the UE, the secondary cell; after receiving a deactivating signaling, deactivating, by the UE, the primary secondary cell.

10. The method of claim 8, wherein the activation/deactivation configuration information comprises configuration information of one deactivation timer;

the determining the cell state comprises: determining whether a secondary cell and a primary secondary cell are to be deactivated according to the deactivation timer; wherein for the primary secondary cell, once the deactivation timer of a secondary cell of the same carrier group is reset, or a secondary cell in the same carrier group has downlink data transmission, resetting the deactivation timer of the primary secondary cell, or if the primary secondary cell has downlink/uplink data scheduling, resetting the deactivation timer of the primary secondary cell;

if the deactivation timer of a cell expires, deactivating, by the UE, the cell, or wherein the activation/deactivation configuration information comprises configuration information of one deactivation timer;

the determining the cell state comprises: determining whether a secondary cell and a primary secondary cell are to be deactivated according to the deactivation timer;

the determining the state of the uplink and downlink carriers of the cell comprises: respectively deactivating uplink and downlink carriers of the primary secondary cell, wherein the respectively deactivating the uplink and downlink carriers of the primary secondary cell comprises: when an activating timer expires, deactivating, by the UE, the downlink carrier, and keeping the uplink carrier in an activated state, wherein a downlink reference carrier used for uplink timing and a pathloss reference carrier used for uplink power control are changed to predefined downlink carriers automatically or are re-configured.

11. The method of claim 8, wherein the activation/deactivation configuration information comprises: at least a deactivation timer for carriers on an unlicensed band and a deactivation timer for carriers on a licensed band;

the determining the cell state comprises: determining whether a cell in an activated state is to be deactivated according to the deactivation timer for the carriers on the unlicensed band and the deactivation timer for the carriers on the licensed band respectively; if the deactivation timer of a cell expires, deactivating, by the UE, the cell, or wherein the activation/deactivation configuration information is transmitted via an activation/deactivation signaling, to indicate whether an uplink or a downlink carrier of the cell is to be activated/deactivated;

determining, by the UE, the state of the uplink and downlink carriers of the cell according to an activation/deactivation indication in the activation/deactivation configuration information.

12. An apparatus for configuring uplink and downlink carriers, the apparatus comprising:

a transceiver configured to transmit or receive data; and a processing unit coupled with the transceiver and configured to:

control the transceiver to receive an uplink and downlink carrier configuration signaling, wherein the uplink and downlink carrier configuration signaling comprises association information of uplink and downlink carriers, timing reference information for an uplink, and pathloss reference cell information for the uplink; and determine, according to the uplink and downlink carrier configuration signaling, pairing between the uplink and downlink carriers, a timing reference downlink carrier for the uplink, and a pathloss reference cell for the uplink, wherein the association information of the uplink and downlink carriers comprises: association information of a primary downlink carrier and a primary uplink carrier or association information of a primary secondary downlink carrier and a primary secondary uplink carrier, wherein the association information of the uplink and downlink carriers is explicitly configured by higher layer signaling, and wherein the timing reference information for the uplink comprises: information of timing advance groups (TAGs) that the uplink and downlink carriers belong to, or information of the timing reference downlink carrier for the uplink.

13. The apparatus of claim 12, wherein the pathloss reference cell information for the uplink comprises: information of a pathloss reference cell configured for a primary uplink carrier, information of a pathloss reference cell configured for an uplink carrier in a secondary TAG (sTAG), or information of a pathloss reference cell fixedly configured for an uplink carrier on an unlicensed band, wherein information of the pathloss reference cell is configured for the primary uplink carrier by:

indicating a paired downlink carrier, or indicating a primary downlink carrier; or indicating any activated downlink carrier or a configured downlink carrier as the timing reference downlink carrier, wherein the configured downlink carrier is an activated or deactivated downlink carrier; or indicating a cell identifier of a cell that the pathloss reference cell belongs to, wherein the information of the pathloss reference cell is configured for the uplink carrier in the sTAG by:

indicating a paired downlink carrier or any downlink carrier in the same TAG as the pathloss reference cell for the uplink carrier; or indicating a paired downlink carrier or a primary secondary downlink carrier which belongs to the same carrier group but a different TAG as the pathloss reference cell for the uplink carrier; or indicating a paired downlink carrier or a primary downlink carrier as the pathloss reference cell for the uplink carrier; or indicating a cell identifier of a cell that the pathloss reference cell belongs to, and wherein the information of the pathloss reference cell is fixedly configured for the uplink carrier on the unlicensed band by:
- fixedly configuring a downlink carrier on the licensed band of the same TAG as the pathloss reference cell; or
- fixedly configuring a primary secondary downlink carrier of the same TAG as the pathloss reference cell; or
- fixedly configuring a primary secondary downlink carrier of the same carrier group but a different TAG as the pathloss reference cell.

14. The apparatus of claim 12, wherein, when determining the timing reference downlink carrier for the uplink or determining the pathloss reference cell for the uplink, if the apparatus does not receive a primary uplink carrier configuration signaling or a timing reference downlink carrier for a primary TAG (pTAG), or a primary uplink carrier configuration signaling or a pathloss reference cell for the pTAG, the processing unit is configured to determine the timing reference downlink carrier for the uplink or the pathloss reference cell for the uplink according to a default configuration, wherein the default configuration comprises a downlink carrier linked with the primary uplink carrier via system information block (SIB)2.

15. An apparatus for activating/deactivating uplink and downlink carriers, the apparatus comprising:
- a receiving unit configured to transmit or receive data; and
- a processing unit coupled with the receiving unit and configured to:
  - control the receiving unit to receive activation/deactivation configuration information, wherein the activation/deactivation configuration information further comprises information of a timing reference downlink carrier used for uplink timing and information of a pathloss reference carrier used for uplink power control,
  - determine an implicit or an explicit activation/deactivation manner,
  - determine a cell state and/or states of uplink and downlink carriers of a cell according to an activation/deactivation parameter in the information, and
  - adjust, by the apparatus, the downlink reference carrier used for the uplink timing and the pathloss reference carrier used for the uplink power control according to the activation/deactivation configuration information.

16. The apparatus of claim 15,
wherein the activation/deactivation configuration information comprises deactivation timer configuration information, wherein deactivation timer and an initial timer value are respectively configured for a primary secondary cell and a secondary cell, the processing unit is configured to respectively determine whether the secondary cell and the primary secondary cell in an activated state is to be deactivated according to deactivation timers of the primary secondary cell and the secondary cell respectively, if the deactivation timer of the secondary cell or the secondary primary cell expires, deactivating the secondary cell or the secondary primary cell, or wherein the activation/deactivation configuration information comprises configuration information of one deactivation timer, the processing unit is configured to determine whether a secondary cell is to be deactivated according to the deactivation timer but not determining whether a primary secondary cell is to be deactivated according to the deactivation timer; if the deactivation timer of the secondary cell expires, deactivating the secondary cell; after receiving a deactivating signaling, deactivating the primary secondary cell.

17. The apparatus of claim 15,
wherein the activation/deactivation configuration information comprises configuration information of one deactivation timer, the processing unit is configured to determine whether a secondary cell and a primary secondary cell are to be deactivated according to the deactivation timer; wherein for the primary secondary cell, once the deactivation timer of a secondary cell of the same carrier group is reset, or a secondary cell in the same carrier group has downlink data transmission, resetting the deactivation timer of the primary secondary cell, or if the primary secondary cell has downlink/uplink data scheduling, resetting the deactivation timer of the primary secondary cell; if the deactivation timer of a cell expires, deactivating the cell, or wherein the activation/deactivation configuration information comprises configuration information of one deactivation timer, the processing unit is configured to determine whether a secondary cell and a primary secondary cell are to be deactivated according to the deactivation timer; and when an activating timer expires, deactivate the downlink carrier of the primary secondary cell, and keep the uplink carrier of the primary secondary cell in an activated state, wherein a downlink reference carrier used for uplink of the primary secondary cell timing and a pathloss reference carrier used for uplink power control are changed to predefined downlink carriers automatically or are re-configured.

* * * * *